(12) United States Patent
Kolinsky et al.

(10) Patent No.: US 10,317,857 B2
(45) Date of Patent: Jun. 11, 2019

(54) SEQUENTIAL DETERMINISTIC OPTIMIZATION BASED CONTROL SYSTEM AND METHOD

(71) Applicant: ROCKWELL AUTOMATION TECHNOLOGIES, INC., Mayfield Heights, OH (US)

(72) Inventors: Jan Kolinsky, Prague (CZ); Jiri Hanzlik, Prague (CZ); Petr Horacek, Prague (CZ); Bijan Sayyarrodsari, Austin, TX (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 1576 days.

(21) Appl. No.: 13/836,701

(22) Filed: Mar. 15, 2013

(65) Prior Publication Data

US 2014/0280301 A1 Sep. 18, 2014

(51) Int. Cl.
  *G05B 13/04* (2006.01)
  *G06F 17/11* (2006.01)
  *G06F 16/903* (2019.01)

(52) U.S. Cl.
  CPC ..... *G05B 13/047* (2013.01); *G06F 16/90335* (2019.01); *G06F 17/11* (2013.01)

(58) Field of Classification Search
  CPC .................. G05B 13/047; G06F 17/11; G06F 17/30979; G06F 17/505; G06F 2217/08; G06F 16/90335; G06N 3/126
  USPC ...................................................... 700/28–55
  See application file for complete search history.

(56) References Cited

U.S. PATENT DOCUMENTS

| | | | |
|---|---|---|---|
| 6,004,015 A * | 12/1999 | Watanabe et al. | ............... 700/28 |
| 6,381,504 B1 | 4/2002 | Havener et al. | |
| 7,050,863 B2 | 5/2006 | Mehta et al. | |
| 7,376,472 B2 | 5/2008 | Wojsznis et al. | |
| 7,685,458 B2 | 3/2010 | Yamaoka | |
| 9,448,546 B2 * | 9/2016 | Sayyarrodsari | ...... G05B 13/047 |
| 2003/0220772 A1 | 11/2003 | Chiang et al. | |
| 2004/0049295 A1 | 3/2004 | Blevins et al. | |

(Continued)

FOREIGN PATENT DOCUMENTS

| | | |
|---|---|---|
| CN | 1163003 A | 10/1997 |
| CN | 1467591 A | 1/2004 |

(Continued)

OTHER PUBLICATIONS

Bemporad, et al.; Ultra-Fast Stabilizing Model Predictive Control via Canonical Piecewise Affine Approximations. IEEE, 2011.

(Continued)

*Primary Examiner* — Jennifer L Norton
(74) *Attorney, Agent, or Firm* — Fletcher Yoder, P.C.

(57) ABSTRACT

The embodiments described herein include one embodiment that a control method including executing an infeasible search algorithm during a first portion of a predetermined sample period to search for a feasible control trajectory of a plurality of variables of a controlled process, executing a feasible search algorithm during a second portion of the predetermined sample period to determine the feasible control trajectory if the infeasible search algorithm does not determine a feasible control trajectory, and controlling the controlled process by application of the feasible control trajectory.

20 Claims, 9 Drawing Sheets

(56) References Cited

U.S. PATENT DOCUMENTS

| | | | |
|---|---|---|---|
| 2004/0114591 A1* | 6/2004 | Naismith et al. | 370/389 |
| 2006/0111881 A1 | 5/2006 | Jackson | |
| 2006/0282177 A1 | 12/2006 | Fuller et al. | |
| 2007/0156259 A1 | 7/2007 | Baramov et al. | |
| 2008/0141062 A1* | 6/2008 | Yamaoka | 713/501 |
| 2009/0240480 A1 | 9/2009 | Baramov | |
| 2009/0319059 A1 | 12/2009 | Renfro et al. | |
| 2010/0100248 A1 | 4/2010 | Minto et al. | |
| 2014/0277601 A1* | 9/2014 | Sayyarrodsari | G05B 13/047 700/29 |
| 2015/0310346 A1* | 10/2015 | Shiraki | G06F 17/11 706/12 |

FOREIGN PATENT DOCUMENTS

| | | | |
|---|---|---|---|
| CN | 1971601 A | 5/2007 | |
| CN | 101807265 A | 8/2010 | |
| CN | 102053599 A | 5/2011 | |
| EP | 1426840 A1 | 6/2004 | |
| EP | 2320283 A1 | 5/2011 | |
| GB | 2496288 A * | 5/2013 | G06N 3/126 |

OTHER PUBLICATIONS

Rossiter; Model-Based Predictive Control: A Practical Approach. CRC Press, 2003.

Goldfarb, et al.; A Numerically Stable Dual Method for Solving Strictly Convex Quadratic Programs. Mathematical Programming 27, North-Holland, 1983, pp. 1-33.

Goldfarb; Efficient Primal Algorithms for Strictly Convex Quadratic Programs. Lecture Notes in Mathematics 1230, Springer-Verlag, Berlin, 1986, pp. 11-25.

Wills, et al.; Fast Linear Model Predictive Control via Custom Integrated Circuit Architecture. IEEE Transactions on Control Systems Technology, vol. 20, No. 1, 2012, pp. 50-71.

Wang, et al.; Fast Model Predictive Control Using Online Optimization. IEEE Transactions on Control Systems Technology, vol. 18, Issue 2, 2010, pp. 267-278.

Rawlings, et al.; Model Predictive Control: Theory and Design, Nob Hill Publishing, 2009.

Gill, et al.; Numerically Stable Methods for Quadratic Programming, Mathematical Programming 14, (1978).

Gill, et al.; A weighted Gram-Schmidt method for convex quadratic programming. Mathematical Programming vol. 30 No. 2, (1984).

Bartlett, et al.; QPSchur: A dual, active-set, Schur-complement method for large-scale and structured convex quadratic programming. Optim. Eng. 7, (2006).

Gill, et al.; A Schur complement method for sparse quadratic programming. In: Reliable Numerical Computation, Oxford University Press, pp. 113-138, (1990).

Anda; Fast Plane Rotation Algorithms, Phd Thesis, University of Minnesota (1995).

González, et al.; A stable model predictive control with zone control. J. Proc. Cont, 19 (2009) 110-122.

Rawlings, et al.; Unreachable Setpoints in Model Predictive Control. IEEE Transactions on Automatic Control, vol. 53, Issue 9, 2008, pp. 2209-2215.

Knagge, et al.; ASIC and FPGA Implementation Strategies for Model Predictive Control.

Daniel Axehill: "Applications of Integer Quadratic Programming in Control and Communication", Linkoping Studies in Science and Technology Thesis No. 1218, Jan. 1, 2005 (pp. 1-130), URL:http://liu.diva-portal.org/smash/get/diva2:21239/FULLTEXT01 [retried on Nov. 20, 2012], pp. 9-32.

Extended European Search Report from EP14160334.0 dated May 30, 2014.

Extended European Search Report from EP14160227.6 dated Jul. 16, 2014.

Extended European Search Report from EP14160228.4 dated Jul. 9, 2014.

Chinese Office Action for CN Application No. 20140098819.6 dated Mar. 16, 2016; 9 Pages.

* cited by examiner

SEQUENTIAL DETERMINISTIC OPTIMIZATION BASED CONTROL SYSTEM AND METHOD

BACKGROUND

The invention relates generally to control systems and more particularly to deterministic optimization based control of systems.

Generally, control systems, such as an industrial plant or a power generation system, may be dynamic and include various constraints. For example, the constraints on the control system may be the result of actuator limits, operational constraints, economical restrictions, and/or safety restrictions. Accordingly, control of such a multivariable constrained dynamic system may be complex. Techniques such as coupled multi-loop proportional-integral-derivative (PID) controllers may not be best suited for handling the control of such complex control systems. On the other hand, one process control technique capable of handling the multivariable constraints is optimization based control (OBC). Specifically, OBC may improve the performance of the control system by enabling the system to operate closer to the various constraints (i.e., via dynamic optimization).

However, OBC may be computationally demanding because the dynamic optimization calculation may involve solving a constrained optimization problem such as quadratic programming (QP) problems at each sampling time. Utilizing a general solver may take seconds or even minutes. In addition, it may be difficult to predict the time it takes for the optimizer to solve the constrained optimization problems. Accordingly, to utilize OBC to control systems with faster dynamics, it may often be beneficial to enable deterministic OBC to provide a feasible control action within a predetermined control time.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment provides a control method including executing an infeasible search algorithm during a first portion of a predetermined sample period to search for a feasible control trajectory of a plurality of variables of a controlled process, executing a feasible search algorithm during a second portion of the predetermined sample period to determine the feasible control trajectory if the infeasible search algorithm does not determine a feasible control trajectory, and controlling the controlled process by application of the feasible control trajectory.

A second embodiment provides a control method, including executing an infeasible search algorithm during a first portion of a predetermined sample period to search for a feasible control trajectory of a plurality of variables of a controlled process, if the infeasible search algorithm does not determine a feasible control trajectory during the first portion of the sample period, making a current control trajectory of the infeasible search algorithm feasible and stabilizing at the end of the first portion of the sample period, executing a feasible search algorithm during a second portion of the sample period to determine the feasible control trajectory based upon the stabilized current control trajectory, and controlling the controlled process by application of the feasible control trajectory.

A third embodiment provides a control system, including memory circuitry for storing executable code, and processing circuitry for executing the code. The code defining steps that, when executed executes an infeasible search algorithm during a first portion of a predetermined sample period to search for a feasible control trajectory of a plurality of variables of a controlled process, if the infeasible search algorithm does not determine a feasible control trajectory during the first portion of the sample period, executes a feasible search algorithm during a second portion of the sample period to determine the feasible control trajectory, and controls the controlled process by application of the feasible control trajectory.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
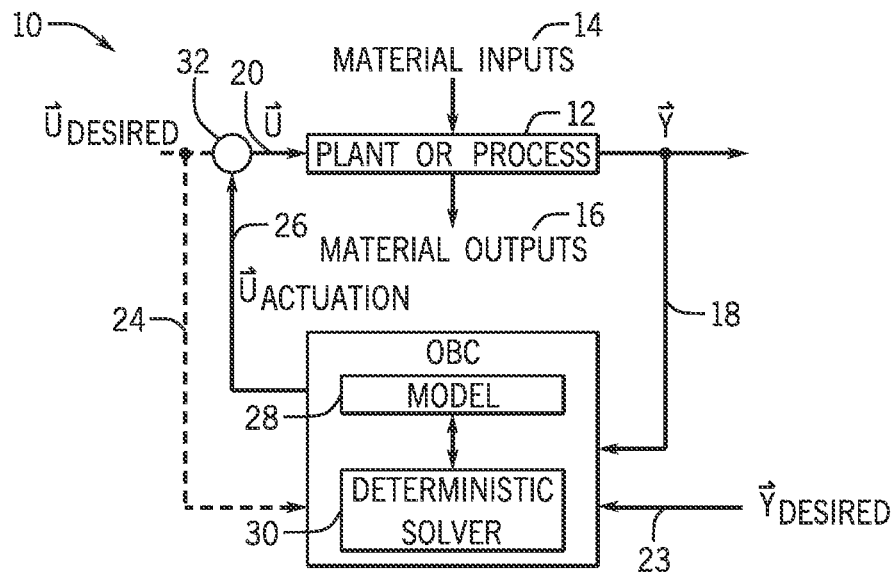
FIG. 1 depicts a block diagram of an embodiment of a control system utilizing deterministic optimization-based control (OBC)

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed toward systems and methods for deterministic optimization-based control (OBC) of a control system, such as an industrial plant, a power generation system, or the like. Generally, control systems may utilize process control techniques to control the system. For example, some control systems utilize proportional-integral-derivative (PID) controllers coupled in a multi-loop configuration. Multi-loop PID controllers may offer a fast real-time control of a control system. In addition, PID controllers may run on embedded systems with less computational power. However, when a control system has complex dynamics and/or its operation is constrained, the complexity of the process control may greatly increase and multi-loop PID controllers may not provide adequate control. For example, the control system may include processes with large dead times or non-minimum phase dynamics.

One process control technique for control of dynamic multivariable systems is optimization-based control (OBC), which can offer better control (e.g. reduces process variations to enable operation closer to constraints at more profitable operating points). Specifically, OBC uses a process model to predict future process output trajectories based on process input trajectories. In other words, OBC computes trajectories of manipulated variables to optimize the objective function (i.e., minimize costs). As used herein, the cost includes the determination of how well the output trajectories match the desired setpoints. It should be appreciated that in linear control systems, the cost may be captured as a quadratic programming (QP) problem. Accordingly, the dynamic optimization included in the OBC may be computationally complex and run on computer servers with general solvers, which may take seconds or even minutes to produce a solution. Thus, to include OBC on an embedded system for real-time process control, it may be beneficial to improve the efficiency of OBC while ensuring that it is stabilizing.

Accordingly, one embodiment provides a control method including determining a linear approximation of a pre-determined non-linear model of a process to be controlled, determining a convex approximation of the nonlinear constraint set, determining an initial stabilizing feasible control trajectory for a plurality of sample periods of a control trajectory, executing an optimization-based control algorithm to improve the initial stabilizing feasible control trajectory for a plurality of sample periods of a control trajectory, and controlling the controlled process by application of the feasible control trajectory within a predetermined time window. In other words, deterministic OBC may be utilized for real-time control of systems with fast dynamics by including a stabilization function to produce a stable feasible solution (i.e., a solution that does not increase the cost function) available for each predetermined sampling time.

By way of introduction, FIG. 1 depicts an embodiment of a control system 10 for a plant/process 12. Generally, the control system 10 may control the functioning of the plant/process 12, which may be an industrial manufacturing system, an automation system, a power generation system, a turbine system, or the like. Accordingly, as depicted, the control system 10 may control the plant/process 12 to transform material inputs 14 into material outputs 16. For example, the plant/process 12 may be a sugar crystallization process that transforms sugar syrup (i.e., material input 14) into sugar crystals (i.e., material output 16). In addition, the control system 10 may control the output variables (i.e., controlled variables) 18 by manipulating the input variables 20 (i.e., manipulated and disturbance variables). Going back to the sugar crystallization example, the control system 10 may manipulate a steam valve (i.e., manipulated variable) to control a temperature (i.e., controlled variable). In some embodiments, the material input can be a manipulated variable as well (for example a controller can control the feed rate for a material input to the plant).

To optimize the control of the plant/process 12, the control system 10 may further include optimization based control (OBC) 22 configured to find a stabilizing feasible solution for an optimization problem within a predetermined time window. In other words, the OBC 22 may determine feasible actions (i.e., solution) for the control system 10 to take. Specifically, the OBC 22 may be configured to determine a control trajectory 26 (i.e., a set of actions) over a control horizon (i.e., period of time to take the actions). Accordingly, the OBC 22 may sample the state of the plant/process 12 at specified sampling times. In some embodiments, the state of the plant/process 12 may include the previous output variables 18, a desired output trajectory 23, a desired control trajectory 24, or any combination thereof. Based on the sampled state of the plant/process 12, the OBC 22 may determine the control trajectory 26 (i.e., a feasible solution to the optimization problem) during the control time. As used herein, control time refers to the time during which the plant/process 12 is functioning, which may be in real-time. After the control trajectory 26 is determined by the OBC 22, in some embodiments, the control trajectory 26 is compared to the desired control trajectory 24 in a comparator 32 to determine the input variables 20 to the plant/process 12 (i.e., actions to be taken in the control system 10). Alternatively, the control trajectory 26 may be directly reflected in the input variables 20. It should be appreciated that the OBC 22 may be implemented on an embedded system, such as ControlLogix, available from available from Rockwell Automation, of Milwaukee, Wis.

To facilitate determining the control trajectory 26, as depicted, the OBC 22 includes a pre-determined model 28 and a deterministic solver 30. Specifically, the deterministic solver 30 may use a feasible search strategy, such as a primal active set method, to determine solutions to the constrained optimization problem. As will be described in more detail below, a feasible search strategy begins at a starting point within the feasible region of the control system 10 and moves around the feasible region to search for an optimum feasible solution (i.e., control trajectory with minimum cost). In other words, the deterministic solver 30 may determine various feasible actions (i.e., control trajectories) that may be taken by the control system 10. Based on the feasible solutions determined by the deterministic solver 30, the model 28 may be utilized to predict the behavior of the process/plant 12. In linear systems or non-linear systems with a linear approximation, the model 28 may be a linear model such as a state space model, a step or impulse response model, an autoregressive with exogenous terms (ARX) model, a transfer function model, or the like. As such, the OBC 22 may compare the cost of each feasible solution and select the control trajectory 26 with the lowest cost.

Ideally, the control trajectory 26 determined is the optimum solution with the lowest cost associated, but, as described above, the optimization calculation may be complex. Accordingly, as will be described in further detail below in the Detailed Example section, the techniques described herein aim to increase the efficiency of the dynamic optimization calculation. For example, the techniques described herein may modify an objective (i.e., cost) function to define the control system 10 constraints with simple bounds. Thus, the dynamic optimization computation may be greatly reduced and executed on an embedded system because many dynamic optimization solvers (e.g., quadratic-programming (QP) solvers) more efficiently handle simple bounds compared to complex constraints.

Although the dynamic optimization may be efficiently configured, the OBC 22 may not always find the optimum (i.e., lowest cost) control trajectory 26 during each control time. However, in practice, a stable sub-optimal control trajectory 26 may be sufficient. As used herein, the control trajectory 26 is stabilizing when the cost does not increase compared to the previous step by taking the actions.

Figure 2:
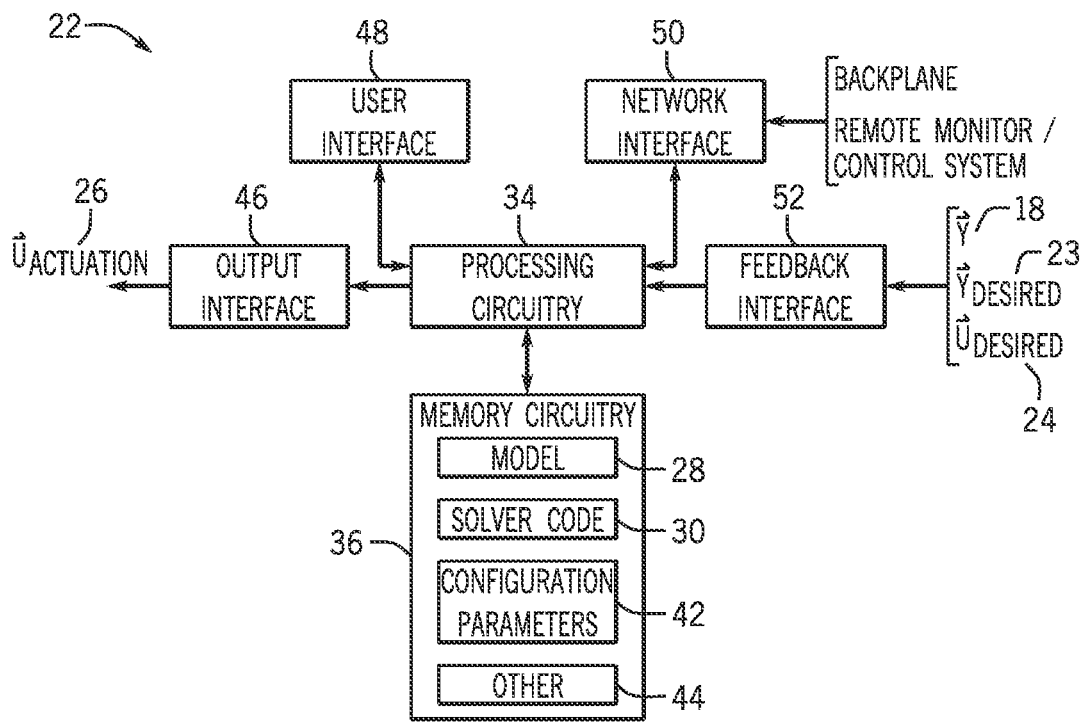
FIG. 2 depicts a block diagram of an embodiment of the deterministic optimization-based control from FIG. 1.
Figure 3:
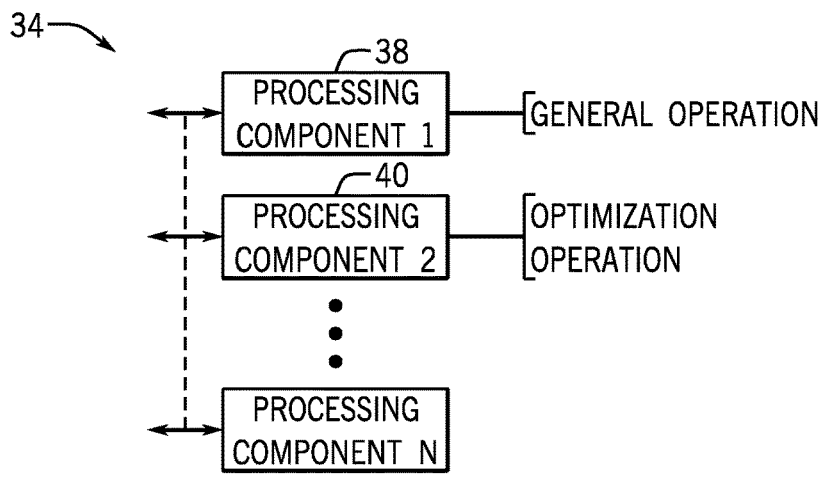
FIG. 3 depicts a block diagram of an embodiment of the processing circuitry from FIG. 2.

To facilitate the functions described herein, it should be appreciated that the OBC 22 may include a processor, useful for executing computing instructions (i.e., steps), and memory, useful for storing computer instructions (i.e., code) and/or data. As depicted in FIG. 2, the OBC 22 may implement the processor through processing circuitry 34 and the memory through memory circuitry 36. More specifically, the processing circuitry 34 may be configured to handle the general functionality of the control system, such as controlling actuators, as well as the functions of OBC 22, such as dynamic optimization. In addition, as depicted in FIG. 3, the processing circuitry 34 may include multiple processing components (e.g., parallel processor cores or separate processor modules), which may enable the processing circuitry 34 to better manage various functions. For example, as depicted, a first processing component 38 may perform the general operations of the control system 10. The general operations of the control system 10 may include controlling components of the control system 10, performing calculations, and the like. As for the OBC 22 functions, the computationally intensive dynamic optimization may be performed on the second processing component 40. Accordingly, this enables the dynamic optimization to be called from the first processing component 38 and executed synchronously or asynchronously on the second processing component 40, which may improve the efficiency of the optimization calculation. Alternatively, it should be appreciated that the dynamic optimization may be performed on the first processing core 38 along with the general functions of the control system 10. Furthermore, as depicted, the processing circuitry 34 includes N processing components, which may each be configured to handle different functions, such as calculating a linear approximation, of the control system 10.

Turning back to FIG. 2, the memory circuit 36 may store computer instructions (i.e., code) describing the model 28, the deterministic solver 30, configuration parameters 42, as well as other instructions 44, such as computing virtual measurements for unmeasured process variables for the general functioning of the control system 10. Specifically, the instructions stored in the memory circuit may be configured to guide the functioning of the model 28 and the deterministic solver 30. Accordingly, the memory circuitry 36 is communicatively coupled to the processing circuitry 34 to enable to processing circuitry 36 to read and/or execute the instructions (i.e., steps).

Figure 4:
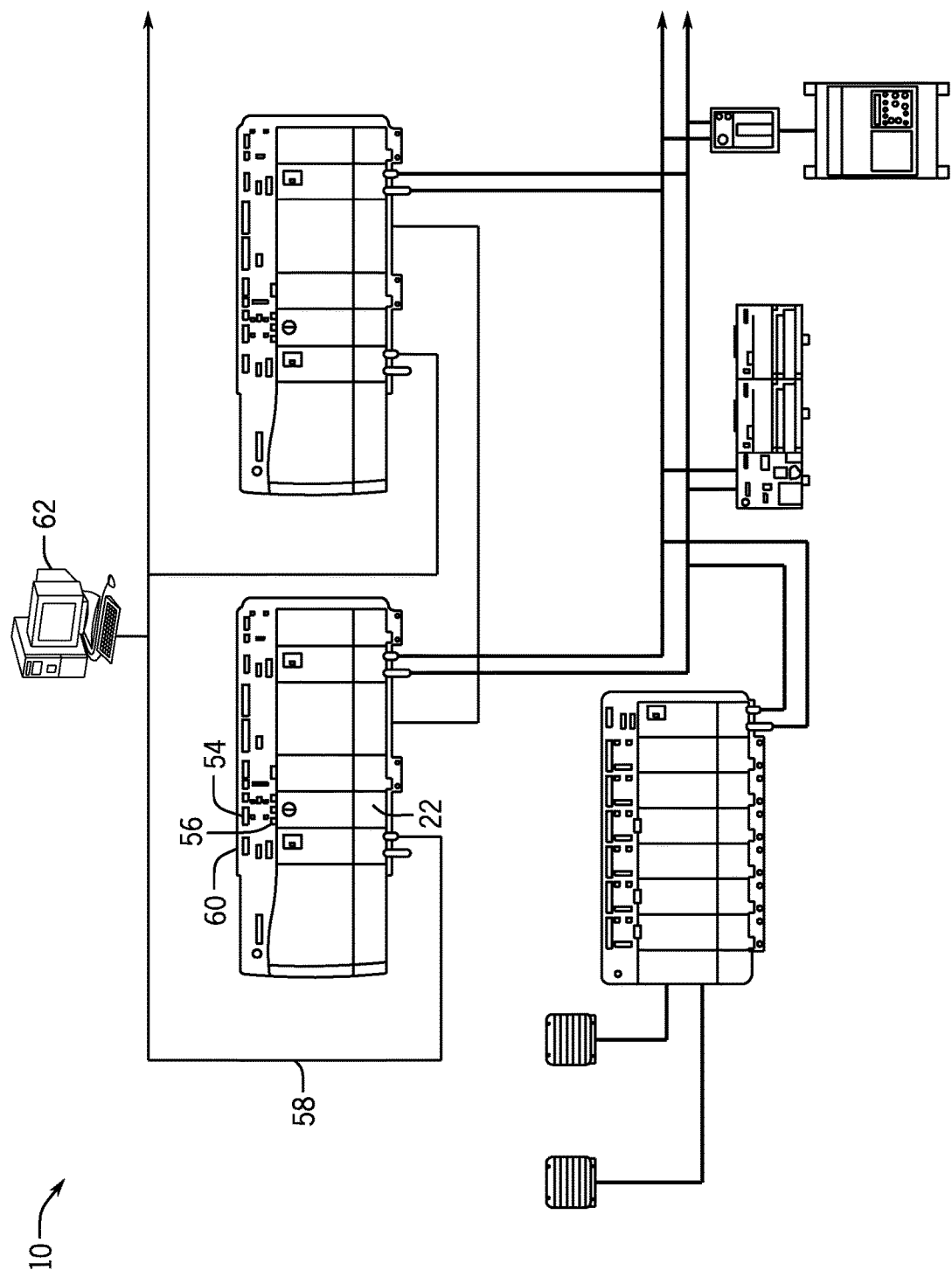
FIG. 4 depicts an embodiment of a deterministic OBC module communicatively coupled to other modules within the control system.

Furthermore, the depicted embodiment of the OBC 22 further includes an output interface 46, a user interface 48, a network interface 50, and a feedback interface 52. Specifically, the user interface 48 may be configured to enable a user to communicate with the OBC 22. For example, as depicted in FIG. 4, the user interface 48 may include a graphical-user-interface (GUI) 54 configured to display metrics of the OBC 22, such as the control trajectory 26 determined. In addition, the user interface 48 may include buttons 56, which enable the user to input commands to the OBC 22. Similar to the user interface 48, the network interface 50 may enable a user to communicate with the OBC 22 over a network 58, such as a wide-area-network (WAN). In some embodiments, the network 58 may be a EtherNet/IP Network or a ControlNet Network, available from Rockwell Automation, of Milwaukee, Wis. More specifically, as depicted in FIG. 4, the network interface 50 may be communicatively coupled to the network 58 via a communication module 60. Alternatively, the network interface 50 may be communicatively coupled directly the network 58 through the backplane of the OBC 22. Furthermore, as depicted, the network 58 may be communicatively coupled to a remote monitoring/control system 62, such as a supervisory control and data acquisition (SCADA), to enable the user to remotely communicate with the OBC 22. Accordingly, as depicted in FIG. 2, both the user interface 48 and the network interface 50 are communicatively coupled to the processing circuitry 34 to enable user commands to be communicated to the processing circuitry 34 and information concerning the OBC 22 to be communicated to the user. Note that each module in memory circuitry 36 may be configured such that it can respond as a server responding to the queries from various interfaces. For example, the model module 28 can be queried by the user interface to report its fidelity. In addition the model module 28 may be called by solver code module 30 to determine the optimal control trajectory.

Turning back to FIG. 2, as described above, the OBC 22 may be configured determine stabilizing feasible control trajectories for the control system 10 based on feedback from the plant/process 12. As such, the feedback interface 52 may be configured to receive feedback, such as the previous output variables 18, the desired output trajectory 23, the desired control trajectory 24, or any combination thereof, and communicate it to the processing circuitry 34. For example, the feedback interface 52 may be a serial port located on the backplane of the OBC 22, which enables the OBC 22 to receive samples from sensors in the control system 10. After the processing circuitry 34 determines a control trajectory 26, the control trajectory 26 is communicated to the output interface 46. As will be described in more detail below, the processing circuitry 34 may utilize various search functions (e.g., QP solvers) and stabilization functions to determine the control trajectory 26. Thus, the output interface 46 may be configured to transmit the control trajectory 26 to the plant/process 12. Similar to the feedback interface 52, the output interface 46 may be a serial port located on the backplane of the OBC 22 to enable the output interface to communicate with a controller controlling inputs into the plant/process 12. It should be appreciated that as described above, the controller may be the same processing component, a different core of a processor, or a different processor module.

Figure 5A:
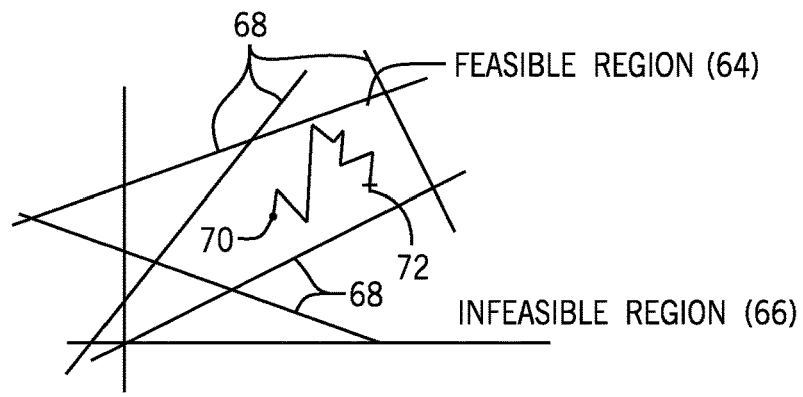
FIG. 5A depicts an embodiment of a feasible search method for solving a quadratic programming problem that has found an optimum solution.
Figure 5B:
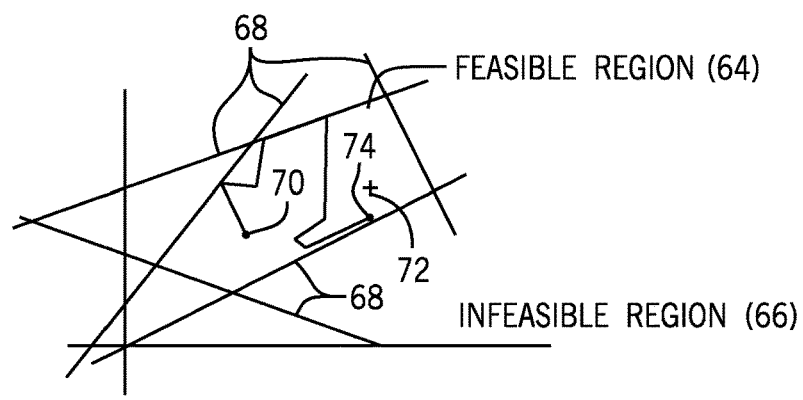
FIG. 5B depicts an embodiment of a feasible search method for solving the quadratic programming problem that has not found the optimum solution.
Figure 5C:
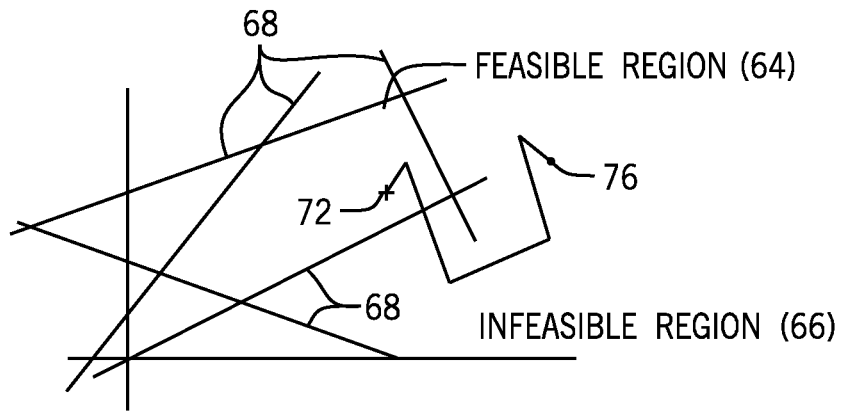
FIG. 5C depicts an embodiment of an infeasible search method for solving the quadratic programming problem that has found the optimum solution.

As described above, the processing circuitry 34 may utilize various solver methods (i.e., algorithms) to facilitate determining a control trajectory 26 (i.e., dynamic optimization). Examples of such solver methods are depicted in FIGS. 5A-5C. Included in each figure, as depicted, is a feasible region 64 and an infeasible region 66. More specifically, the feasible region 64 is all of the solutions or control trajectories 26 that do not violate the constraints of the control system 10. On the other hand, the solutions or control trajectories 66 in the infeasible region violate the constraints of the control system 10 and are infeasible. As depicted, constraints are depicted as constraint lines 68, which separate the feasible region 64 and the infeasible region 66. As described above, the constraints may be the result of actuator limits, technological restrictions, economical restrictions, and/or safety restrictions.

Specifically, FIGS. 5A and 5B depict feasible search methods (i.e., algorithms) and FIG. 5C depicts an infeasible search method (i.e., algorithms). However, it should be appreciated that the figures are not meant to depict any particular search method or algorithm and are merely illustrative. As depicted in both FIG. 5A and FIG. 5B, the feasible search method begins from a feasible point 70 within the feasible region 64. From the starting feasible point 70, the feasible search method moves around the feasible region 64 searching for the optimum solution (i.e., control trajectory) 72 during the control time. In some cases, as shown in FIG. 5A, an optimum control trajectory 72 is found. In others, as shown in FIG. 5B, a suboptimal but still feasible control trajectory 74 is found. An example of a feasible search method is a primal active set solver method (i.e., algorithm). Comparatively, as depicted in FIG. 5C, the infeasible search method begins from an infeasible point 76 within the infeasible region 66. From the starting infeasible point 76, the infeasible search method determines infeasible solutions until it converges on the optimum solution (i.e., control trajectory) 72. An example of an infeasible search method is a dual active set solver method. Accordingly, it should be appreciated that, if terminated before the optimum control trajectory 72 is found, the feasible search method will produce a feasible control trajectory, but the infeasible search method may produce an infeasible control trajectory.

In addition, as described above, the dynamic optimization (e.g., feasible search method or infeasible search method) may be run asynchronously from the rest of the control system 10. Thus, if a less than optimum control trajectory is found during the control time, the optimization may continue into the following control times, which gives the OBC 22 more time for complex optimization calculations. Furthermore, when the optimum trajectory 72 is found, it may be time shifted, padded, and included in future optimization calculations.

Figure 6:
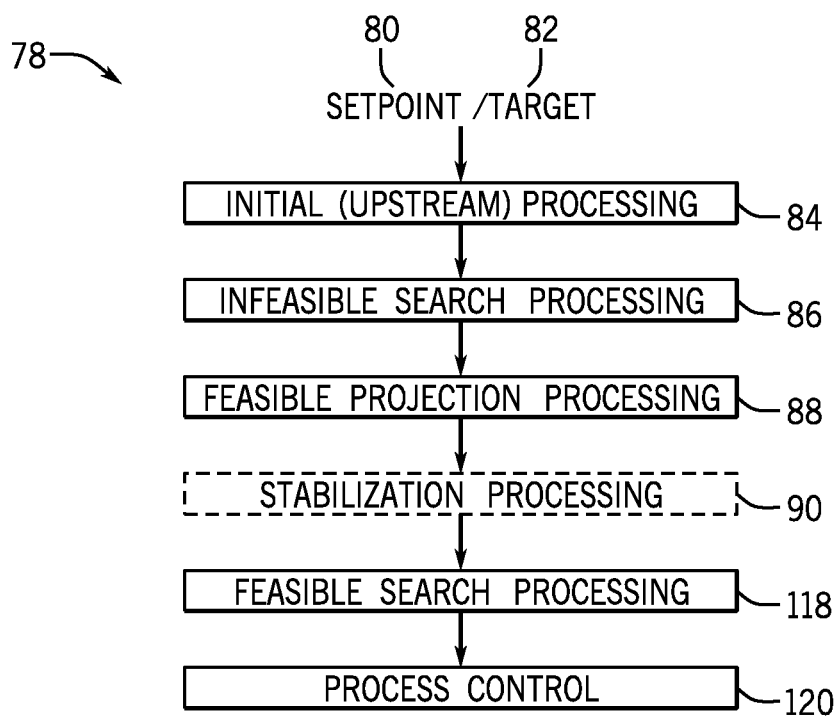
FIG. 6 is a flow chart depicting an embodiment of a process control utilizing sequential solvers.

Furthermore, is some cases, the infeasible search method may converge on an optimum solution (i.e., control trajectory) faster than the feasible search method; however, as noted above, the infeasible search may produce an infeasible solution if terminated prematurely. Accordingly, to utilize the strengths of both the feasible search method and the infeasible search method, as depicted in FIG. 6, a sequential deterministic optimization based control (OBC) process (i.e., algorithm) 78 may be implemented on the OBC 22. Specifically, this may include dividing the maximum execution time (i.e., control time) between the infeasible search method and the feasible search method and running them sequentially. Beginning the process 78, user-defined setpoints 80 and/or feasible targets (i.e., infeasible setpoints mapped into feasible region) 82 may be input into an initial (i.e., upstream) processing, which may be configured to determine a starting point and constraints (i.e., active set) for the following search methods (process block 84). For example, this may include using a warm start based on a previous solution. Based on the starting point and constraints, the infeasible search method may run (process block 86). More specifically, the infeasible search method 86 may run for a period of time shorter than the maximum execution time (i.e., control time). If the infeasible search method 86 finds the optimum solution, the process 78 may cease. If on the other hand, during its allotted time, the infeasible search 78 has found an infeasible solution, a projection operation occurs to project the infeasible solution into the feasible region 64 (process block 88). In some embodiments, this may involve finding the point in the feasible region 64 closest to the infeasible solution. Another example projection operation 88 may be seen in the Detailed Example section.

Figure 7:
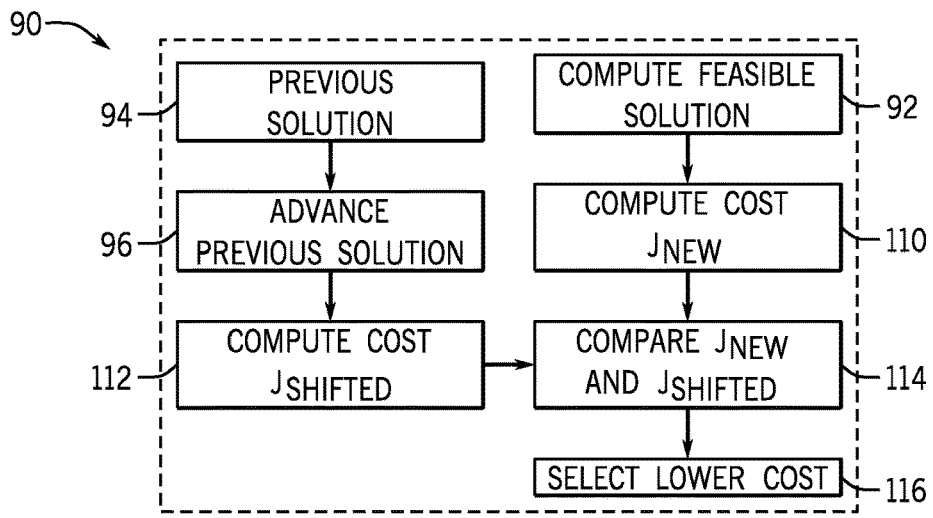
FIG. 7 depicts a block diagram of an embodiment of a stabilization process used in the optimization-based control.

Because in some embodiments the infeasible search 86 and the projection operation 88 may find a suboptimal solution (i.e., control trajectory 74) during the allotted execution time, a stabilization process 90 may be useful, however optional, to stabilize the control system 10. In other words, the stabilization process 90 may be configured to reduce the risk that the cost of the control system 10 will increase because of the suboptimal control trajectory 74. As depicted in FIG. 7, the stabilization process 90 may begin by computing a feasible solution or control trajectory (process block 92). In relation to FIG. 6, the feasible solution is the projection of the infeasible solution into the feasible region 64.

Figure 8A:
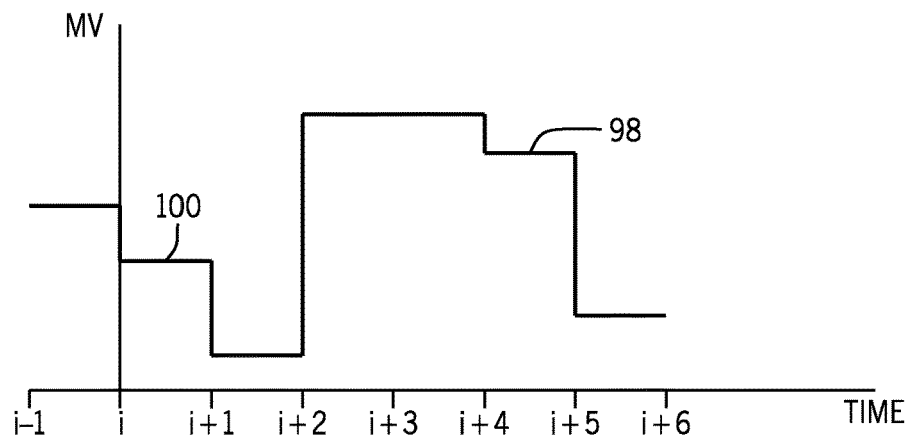
FIG. 8A depicts a first feasible solution for the quadratic programming problem.
Figure 8B:
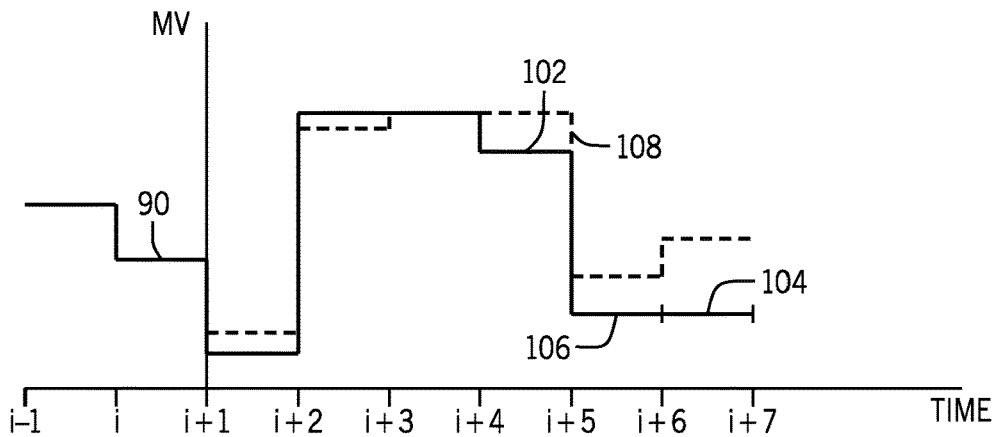
FIG. 8B depicts the first feasible solution advanced one step compared to a second feasible solution for the quadratic programming problem.

To stabilize the control system 10, the feasible solution determined in process block 92 (i.e., first stabilizing control trajectory) may be compared to a previous solution (i.e., second stabilizing control trajectory) determined in process block 94. More specifically, the previous solution is advanced, which may include shifting and padding, to the next control time (process block 96). As an example, FIG. 8A depicts a control trajectory 98 with a control horizon of six (i.e., six time steps) determined at time i. As described above, the control trajectory 98 represents a setting of a manipulated variable, such as the percent a valve is open. Accordingly, based on the control trajectory 98, the control system 10 will take a first action 100 for the control time between time i and time i+1. At time i+1, the first action 100 has been performed. Thus, as depicted in FIG. 8B, the remaining control trajectory 98 (i.e., trajectory between time i+1 and time i+6) is time shifted to form a previous solution 102. In addition, because the control horizon for the time shifted control trajectory is five (i.e., five time steps), the previous solution is 102 is padded with an additional control system action 104. In some embodiments, this may include repeating the last control system action 106. Furthermore, FIG. 8B depicts a newly calculated solution 108, such as by process block 88, represented by the dashed line. Accordingly, the previous solution 102 may be compared to the newly calculated solution 108.

Turning back to FIG. 7, after the previous solution 102 and the newly calculated solution 108 are adjusted to the same control horizon, one characteristic to be compared may be the cost of each. Accordingly, based on the objective (i.e. cost) function, the cost for the newly calculated solution 108 (process block 110) and the cost of the previous solution 92 may be calculated (process block 112). Next, the cost of the new solution 110 is compared with the cost of the previous solution 102 (process block 114). Finally, the solution (i.e., control trajectory) with the lowest cost may be selected (process block 116).

Turning back to FIG. 6, the feasible search method may be initialized with either the projected solution determined in process block 88 or the stabilized solution determined in process block 90 (process block 118). Initializing the feasible search 88 with results from the infeasible search 86 may enhance the efficiency of the feasible search 88. For example, this may include initializing the feasible search 88 with a better initial point, initial active set (i.e., set of constraints), and/or matrix factorizations. Furthermore, as will described in more detail in the Detailed Example section, the searches (i.e., 88 and 86) may be implemented to use the same matrix factorization, which results in a seamless transition between the two. Finally, based on the control trajectory determined by the feasible search 88, the manipulated variables 20 may be input into the plant/process 12 to be controlled (process block 120).

Figure 9:
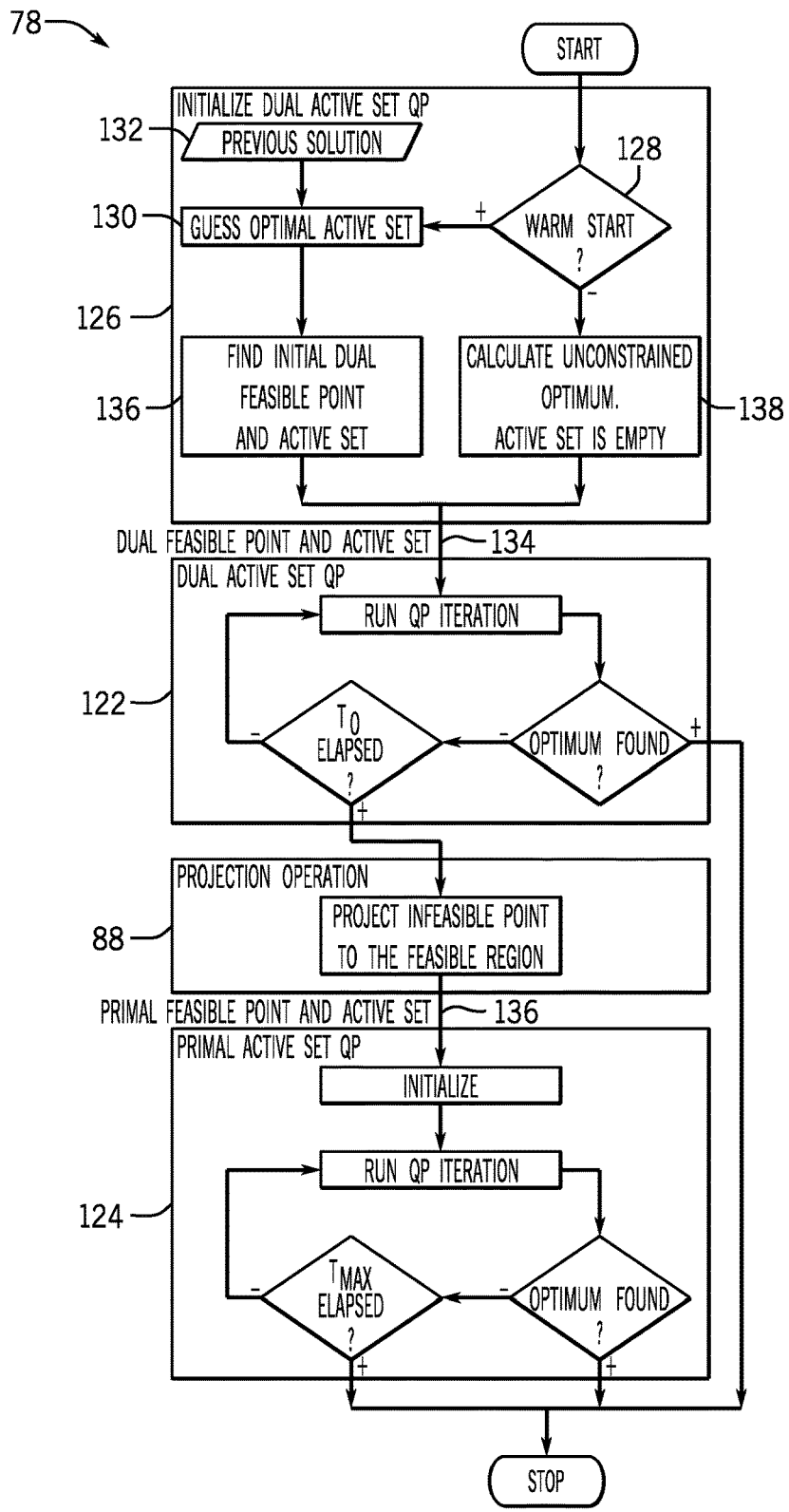
FIG. 9 depicts an embodiment of dynamic optimization-based control (OBC) utilizing a steady state block, a dynamic target generator block, and a dynamic optimization block.
Figure 10:
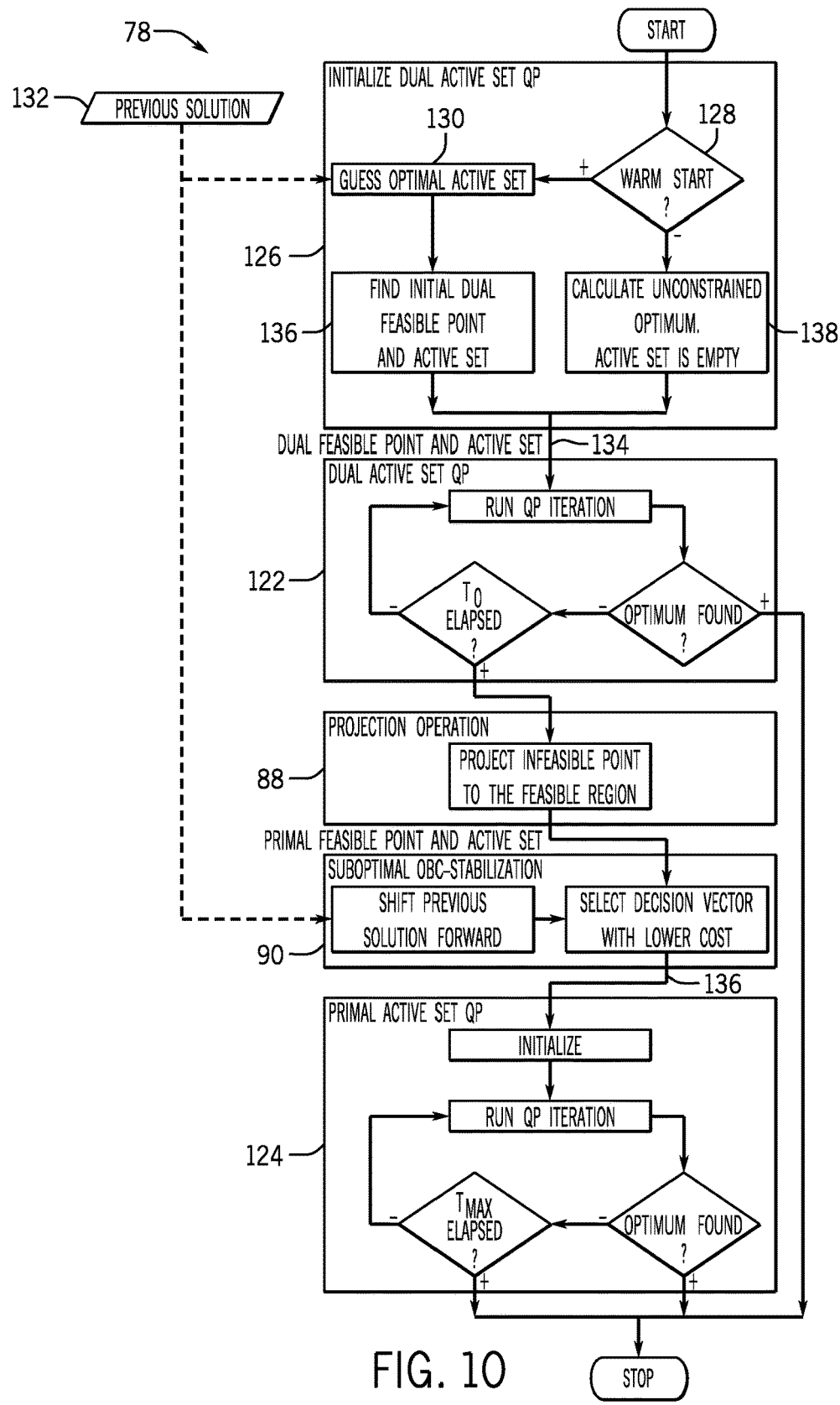
FIG. 10 depicts an embodiment of dynamic optimization-based control (OBC) utilizing a steady state block and a dynamic target generator block.

FIGS. 9 and 10 depict different embodiments of OBCs 22 utilizing the sequential deterministic optimization based process control 78. Furthermore, as depicted, both embodiments utilize a dual active set solver method 122 as the infeasible search method and a primal active set solver method 124 as the feasible search method. As there may be several implementations for each solver method (i.e., 122 and 124), different implementations pairing (i.e., an implementation of dual active search 122 paired with an implementation of primal active set solver 124) can be found in the Detailed Example section.

As described in FIG. 6, process 78 begins with initial processing 84. In the embodiment depicted in FIG. 9, the initial processing 84 may include initializing the dual active set solver (process block 126). As depicted, initializing the dual active set solver may optionally utilize a warm start 128. Specifically, the warm start 128 may guess an optimal active set (i.e., set of constraints) 130 based on a previous solution 132. Accordingly, the warm start may be useful when the dynamic optimization problem is similar in subsequent control times. If a warm start is not utilized, the initial active set is empty. Based on the initial active set, a dual feasible point and active set 134 may be determined. If a warm start 128 is used, constraints corresponding to dual variables (i.e., Lagrange multipliers) with the wrong (i.e., negative) sign in the guessed optimal active set 130 may be removed until all dual variable have correct (i.e., nonnegative) sign. A further description of the dual variables may be seen in the Detailed Example section. Alternatively, if the warm start 128 is not used, the dual feasible point may be the unconstrained solution of the optimization problem.

Next, as described in FIG. 6, the dual feasible point and active set 134 are used to initialize the dual active set solver method 124, and if the dual active set solver method 124 finds the optimum solution in its allotted time, the process 78 terminates. If the allotted time has expired, the projection processing 88 projects the infeasible solution into the feasible region 64. In the depicted embodiment, the projection processing produces a primal feasible point and active set 136.

The primal active set solver method 124 may then be initialized through various manners. For example, the primal active set solver method 124 may use the result of the projection processing 136, adjust the result of the projection processing 136 by adding selected constraints that become active after the projection operation 136, or adjust the result of the projection processing 136 by adding selected constraints that become active after the projection operation 136 and by adding artificial constraints to satisfy a constrained sub-problem. Finally, the primal active set solver method 124 may use the remaining time to search for an optimum solution (i.e., control trajectory).

In addition to the functions included in FIG. 9, FIG. 10 further includes the stabilization process 90, which may be useful for optimization problems with simple bound constraints. Specially, for this type of well-structured constraints, the projection operation can be efficiently calculated, for example by a clipping operation.

Figure 11:
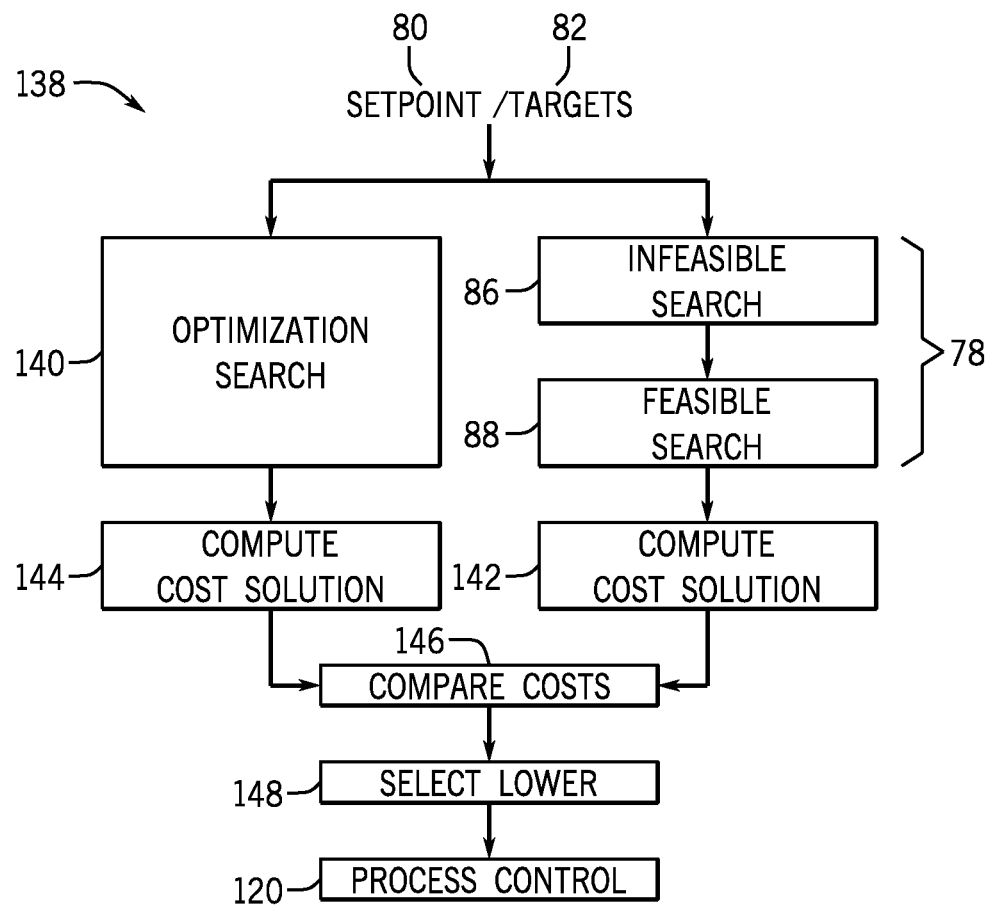
FIG. 11 depicts a block diagram of an embodiment of the optimization based control with a sequential optimization search running in parallel with another optimization search.

Furthermore, as described above, the OBC 22 may be run on multiple components (i.e., 38 and 40), which enables multiple processes to be run asynchronously. Accordingly, as depicted in FIG. 11, the OBC 22 may utilize multiple optimization searches in parallel, which as should be appreciate may increase the probability of finding the optimum solution (i.e. control trajectory). Specifically, FIG. 11 depicts a parallel deterministic optimization based control (OBC) process 138 including the sequential deterministic optimization based control (OBC) process 78. As depicted, the sequential deterministic optimization based control (OBC) process 78 is in parallel with another optimization search (i.e., solver) 140, which may be any optimization solver method (i.e., algorithm). It may be useful to parallel process 78 with another infeasible search 86 that is allotted a longer maximum execution time because, as described above, process 78 will return a feasible solution. Alternatively, process 78 may be paralleled with another feasible search 88 so that the feasible search may serve as a backup to process 78 while additionally searching for the optimum solution (i.e., control trajectory).

After process 78 and optimization search 140 have terminated, the results may be compared. For example, as depicted, the cost of process 78 (process block 142) and the cost of the parallel optimization search 140 (process block 144) may be calculated based on the objective (i.e., cost) function. These costs may be compared (process block 146) and the lower cost may be selected (process block 148). Finally, based on the control trajectory selected, the manipulated variables 20 input into the plant/process 12 may be controlled (process block 120).

In addition, it should be appreciated that the optimization searches (i.e., 78 and 140) may be run synchronously or asynchronously. For example, process 78 and parallel optimization search 140 may be called substantially simultaneously. Alternatively, one (i.e., 78 or 140) may be called and allowed to run on a processing component (e.g., 38 or 40) while the control system 10 continues with its normal functioning, which provides the search method (i.e., 78 or 140) with a longer search time. Then, the other (i.e., 78 or 140) may be called subsequently.

Detailed Example

Below is a detailed example to help illustrate the techniques taught herein. First, as described above, the efficiency of the OBC 22 may be increased by simplifying the dynamic optimization calculation. In some embodiments, this may include simplifying the model 28. Generally, the model 28 may be expressed as a standard formula.

$$y = A_u \Delta u + y_{free} \quad (1)$$

where
$\Delta u = [(\Delta u_1)^T, (\Delta u_2)^T, \ldots, (\Delta u_{n_u})^T]^T$—future changes of all inputs arranged in a vector
$\Delta u_n = [\Delta u_n(t), \Delta u_n(t+1), \ldots, \Delta u_n(t+n_c-1)]^T$—future changes of n-th input
$y = [(y_1)^T, (y_2)^T, \ldots, (y_{n_y})^T]^T$—all predicted output trajectories arranged in a vector
$y_j = [y_j(t+1), \ldots, y_j(t+p)]^T$—predicted trajectory of j-th output
$y_{free} = [(y_{free}^1)^T, (y_{free}^2)^T, \ldots, (y_{free}^{n_y})^T]^T$—all free response trajectories arranged in a vector
$y_{free}^j = [y_{free}^j(t+1), \ldots, y_{free}^j(t+p)]^T$—free response trajectory of j-th output
$n_u$—number of inputs
$n_y$—number of outputs
$n_c$—control horizon
p—prediction horizon
$N = n_c$—number of control moves Specifically, the standard formula (equation 1) reflects the superposition principle: the total future response (i.e., output trajectory) is a sum of responses to future inputs and responses to past inputs, disturbances, and initial conditions (i.e., $y_{free}$). The response $y_{free}$ may be updated at each sample time according to particular model structure. Accordingly, the predicted output trajectory of the j-th output may be expressed similar to equation 1.

$$y_j = A_{uj} \Delta u + y_{free}^j \quad (2)$$

where
$A_{uj} = [A_{uj}^1, A_{uj}^2, \ldots, A_{uj}^{n_u}]$—prediction matrix of j-th output
$A_u = [A_{u1}^T, A_{u2}^T, \ldots, A_{un_y}^T]^T$—prediction matrix Furthermore, the following equation represents the changes of inputs (i.e., incremental inputs).

$$\Delta u(k) = u(k) - u(k-1) \quad (3)$$

In addition, the following represent the absolute inputs.

$u_n = [u_n(t), u_n(t+1), \ldots, u_n(t+n_c-1)]^T$—future trajectory of n-th input $u = [(u_1)^T, (u_2)^T, \ldots, (u_{n_u})^T]^T$—future input trajectories arranged in a vector (4)

Thus, to help simplify the above equations, relative inputs may be used instead of incremental inputs. Specifically, the constraints may be simplified and the Hessian matrix may be better conditioned. As used herein $u_r$ represents the relative input and is defined as difference from current value of input. Accordingly, $u_r$ may be expressed as follows.

$$u_{ri}(k) = u_i(k) - u_{0i} \quad (5)$$

where
$u_{ri}$—i-th relative input
$u_{0i} = u_i(t-1)$—current value of the i-th input
Based on the definition of $u_n$, equation (5) may alternatively expressed as follows.

$$u_{ri} = u_i - 1 u_{0i}, \; 1^T = [1, 1, \ldots 1]^T \quad (6)$$

Thus, the linear transformation between the relative input ($u_r$) and the incremental input ($\Delta u$) is as follows.

$$\Delta u_i(k) = u_i(k) - u_i(k-1) = \Delta u_{ri}(k) = u_{ri}(k) - u_{ri}(k-1) \quad (7)$$

$$u_{ri}(k) = \sum_{j=t}^{k} \Delta u_i(j)$$

$$u_{ri} = S \Delta u_i, \; S = \begin{bmatrix} 1 & 0 & 0 & \ldots & 0 \\ 1 & 1 & 0 & & 0 \\ 1 & 1 & 1 & & 0 \\ \vdots & & & \ddots & 0 \\ 1 & 1 & 1 & 1 & 1 \end{bmatrix},$$

$$\Delta u_i = S^{-1} u_{ri}, \; S^{-1} = \begin{bmatrix} 1 & 0 & 0 & \ldots & 0 \\ -1 & 1 & 0 & & 0 \\ 0 & -1 & 1 & & 0 \\ \vdots & & & \ddots & \vdots \\ 0 & 0 & \ldots & -1 & 1 \end{bmatrix}$$

$$\Delta u = S_c^{-1} u_r, \; S_c^{-1} = \begin{bmatrix} S^{-1} & 0 & \ldots & 0 \\ 0 & S^{-1} & & 0 \\ \vdots & & \ddots & \\ 0 & 0 & & S^{-1} \end{bmatrix},$$

$$u_r = S_c \Delta u, \; S_c = \begin{bmatrix} S & 0 & \ldots & 0 \\ 0 & S & & 0 \\ \vdots & & \ddots & \\ 0 & 0 & & S \end{bmatrix}$$

$$u_r = u - I_c u_0, \; I_c = \begin{bmatrix} 1 & 0 & \ldots & 0 \\ 0 & 1 & & 0 \\ \vdots & & \ddots & \\ 0 & 0 & & 1 \end{bmatrix}, \; u_0 = \begin{bmatrix} u_{01} \\ u_{02} \\ \vdots \\ u_{0n_u} \end{bmatrix}$$

$$u = S_c \Delta u + I_c u_0$$

Accordingly, the model 28 (i.e., equation 1) based on the relative input may be expressed as follows.

$$y = A_u \Delta u + y_{free} = (A_u S_c^{-1}) u_r + y_{free} = A_r u_r + y_{free} \quad (8)$$

In addition to simplifying the model 28, cost function (i.e., objection function) may also be simplified to enhance the efficiency of the OBC 22. Generally, a quadratic objective function may be expressed as follows.

$$J_y = \sum_{j=1}^{n_y} (y_j - y_j^t)^T W_j (y_j - y_j^t) + \quad (9)$$

$$\sum_{n=1}^{n_u} \Delta u_n^T B_n \Delta u_n + \sum_{n=1}^{n_u} (u_n - u_n^t)^T V_n (u_n - u_n^t)$$

where
$W_j, B_n, V_n$—positive semidefinite weight matrices (tuning parameters)
$y_j^t = [y_j^t(t+1), y_j^t(t+2), \ldots, y_j^t(t+p)]^T$—output target trajectory
$u_n^t = [u_n^t(t+1), u_n^t(t+2), \ldots, u_n^t(t+p)]^T$—input target trajectory Using standard algebraic manipulation the objective function can be transformed to the following quadratic form.

$$J_y(\Delta u) = \frac{1}{2}\Delta u^T G_y \Delta u + f_y^T \Delta u + C \tag{10}$$

where $G_y$ is Hessian, $f_y$ is a linear term and C is constant term that can be omitted for optimization. We assume that $B_n$ matrices are positive definite and so $G_y$ is also positive definite.

One of the most important features of OBC is that it can handle constraints. The constraints for the n-th input may be represented as follows.

$i=0 \ldots n_c-1$:

$u_{min}(n) \le u_n(t+i) \le u_{max}(n)$ — simple bounds $\Delta u_{min}(n) \le \Delta u_n(t+i) \le \Delta u_{max}(n)$ — rate of change constraints $\tag{11}$ In a compact form, the constraints may be represented as follows.

$\Delta u_{max} = [\Delta u_{max}(1), \ldots, \Delta u_{max}(n_u)]^T$ $\Delta u_{min} = [\Delta u_{min}(1), \ldots, \Delta u_{min}(n_u)]^T$ $I_c \Delta u_{min} \le \Delta u \le I_c \Delta u_{max}$ $u_{max} = [u_{max}(1), \ldots, u_{max}(n_u)]^T$ $u_{min} = [u_{min}(1), \ldots, u_{min}(n_u)]^T$ $u_{min} \le u \le u_{max}$ $u_{min} \le S_c \Delta u + I_c u_0 \le u_{max}$ $I_c(u_{min}-u_0) \le S_c \Delta u \le I_c(u_{max}-u_0) \tag{12}$ In some cases, controlled variable (i.e., output) may lie within a specific range (i.e., between $y_{min}$ and $y_{max}$). This formulation may lead to more robust and less aggressive control actions but may also results in a more complex optimization calculation. However, if the optimization calculation has hard constraints on outputs, then an infeasible control trajectory may be found. Accordingly, soft constraints with slack variables may be used. However, in order to not to dramatically increase number of decision variables or number of complex constraints, the optimization calculation may be simplified by only adding one additional variable with simple bounds per constrained output. This additional variable may be interpreted as an optimized target that must lie within the specific output range (i.e., between $y_{min}$ and $y_{max}$). For example, output target trajectory $y^t$ may be defined by an additional decision variable z and the constrained outputs may be defined by $n_z$ with indices $k_1 \ldots k_{n_z}$. Accordingly, objective function and constraints may be defined as follows.

$$J_z(\Delta u, z) = \tag{13}$$

$$\sum_{i=1}^{n_z} (y_{k_i} - 1z_i)^T M_i (y_{k_i} - 1z_i) = \begin{bmatrix}\Delta u \\ z\end{bmatrix}^T G_z \begin{bmatrix}\Delta u \\ z\end{bmatrix} + f_z^T \begin{bmatrix}\Delta u \\ z\end{bmatrix} + C$$

$y_{min} \le z \le y_{max}$

-continued $1 = [1, 1, \ldots 1]^T, z = [z_1, z_2, \ldots z_{n_z}]^T$ $y_{max} = [y_{max}(1), \ldots, y_{max}(n_z)]^T, y_{min} = [y_{min}(1), \ldots, y_{min}(n_z)]^T$ Furthermore, because overall objective function J is then sum $J = J_y + J_z$ the optimization calculation may be as follows.

$$\min_{\Delta u, z} J(\Delta u, z) = \begin{bmatrix}\Delta u \\ z\end{bmatrix}^T G \begin{bmatrix}\Delta u \\ z\end{bmatrix} + f^T \begin{bmatrix}\Delta u \\ z\end{bmatrix} + C \tag{14}$$

$I_c \Delta u_{min} \le \Delta u \le I_c \Delta u_{max}$ $I_c(u_{min}-u_0) \le S_c \Delta u \le I_c \Delta(u_{max}-u_0)$ $z_{min} \le z \le z_{max}$ Using the transformation $\Delta u = S_c^{-1} u_r$ in equation (7), the optimization problem based on relative inputs $(u_r)$ is as follows.

$$\min_{u_r, z} J_r(u_r, z) = \begin{bmatrix}u_r \\ z\end{bmatrix}^T G_r \begin{bmatrix}u_r \\ z\end{bmatrix} + f_r^T \begin{bmatrix}u_r \\ z\end{bmatrix} \tag{15}$$

Figure 12A:
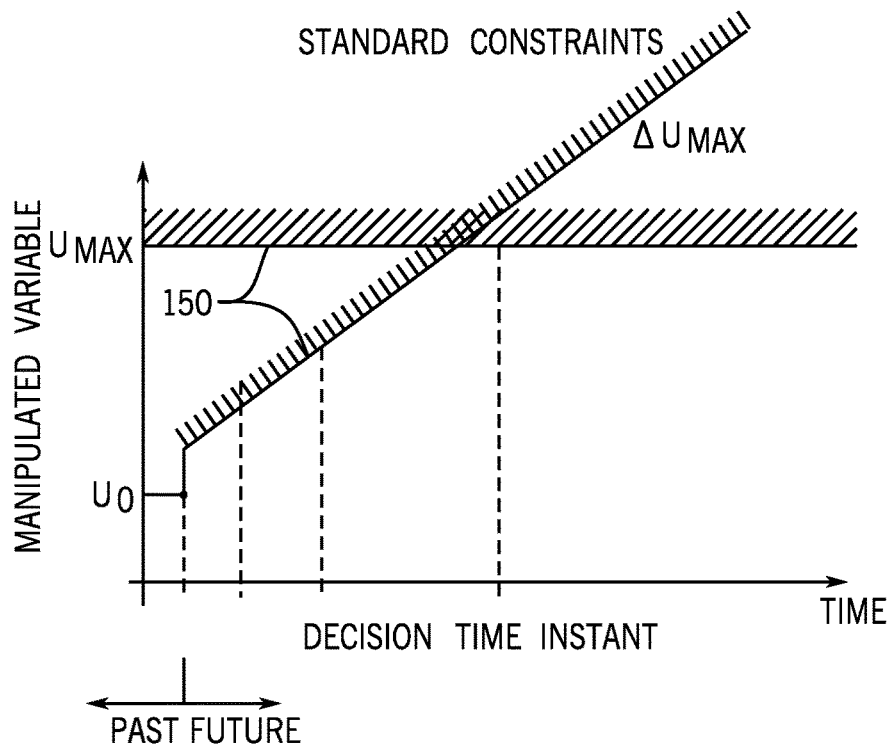
FIG. 12A depicts an embodiment of complex constraints.
Figure 12B:
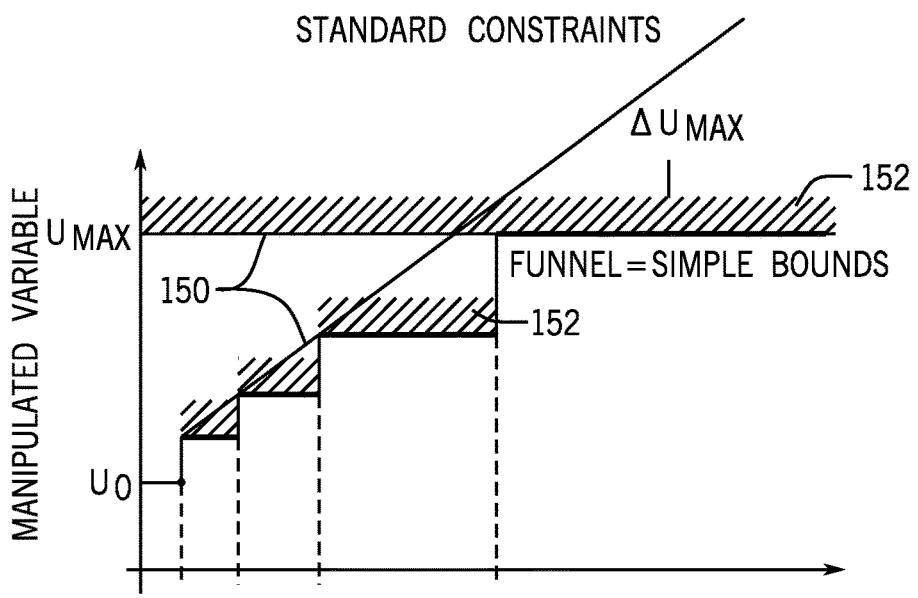
FIG. 12B depicts and embodiments simple bound constraints acting as a funnel for the complex constraints.

$I_c(u_{min}-u_0) \le u_r \le I_c(u_{max}-u_0)$ $I_c \Delta u_{min} \le S_c^{-1} u_r \le I_c \Delta u_{max}$ $z_{min} \le z \le z_{max}$ Accordingly, taking advantage of the fact that feasible search methods more efficiently handle simple bound constraints as compared to complex constraints 150 (e.g., a rate of change constraint), depicted in FIG. 12A, the simple bound constraints 152 may be configured to act as a funnel as depicted in FIG. 12B. Thus, the simple bounds may be expressed as follows.

$n = 1 \ldots n_u$: $\tag{16}$ $u_{max}^m(i) = \min(u_{max}(n) - u_0(n), i \cdot \Delta u_{max}(n)), \quad i = 1 \ldots n_c$ $u_{min}^m(i) = \max(u_{min}(n) - u_0(n), -i \cdot \Delta u_{min}(n))$ $u_{max}^m = [u_{max}^m(1), \ldots, u_{max}^m(n_c)]^T, u_{max}^m = [(u_{max}^{r1})^T, \ldots, (u_{max}^{m_u})^T]^T$ $u_{min}^m = [u_{max}^m(1), \ldots, u_{max}^m(n_c)]^T, u_{min}^m = [(u_{min}^{r1})^T, \ldots, (u_{min}^{m_u})^T]^T$ Thus, the optimization calculation may be expressed as follows.

$$\min_{u_r, z} J_r(u_r, z) = \begin{bmatrix}u_r \\ z\end{bmatrix}^T G_r \begin{bmatrix}u_r \\ z\end{bmatrix} + f_r^T \begin{bmatrix}u_r \\ z\end{bmatrix} \tag{17}$$

$u_{min}^r \le u_r \le u_{max}^r$ $I_c \Delta u_{min} \le R u_r \le I_c \Delta u_{max}$, $z_{min} \le z \le z_{max}$ $$R = \begin{bmatrix} R_u & 0 & \cdots & 0 \\ 0 & R_u & & 0 \\ \vdots & & \ddots & \\ 0 & 0 & & R_u \end{bmatrix},$$

$$R_u = \begin{bmatrix} -1 & 1 & 0 & & 0 \\ 0 & -1 & 1 & & 0 \\ & & & \ddots & \vdots \\ 0 & 0 & \ldots & -1 & 1 \end{bmatrix},$$

Furthermore, using a common variable $x = [u_r^T, Z^T]^T$ with n elements we get the following resulting optimization problem in a standard form as follows.

$$\min_x \; J_r(x) = x^T G_r x + f_r^T x \tag{18}$$

$$x_{min} \leq x \leq x_{max}$$

$$\Delta x_{min} \leq Rx \leq \Delta x_{max}$$

$$R = \begin{bmatrix} R_u & 0 & \ldots & 0 \\ 0 & R_u & & 0 \\ \vdots & & \ddots & \\ 0 & 0 & & R_u \end{bmatrix},$$

$$n = n_u N + n_z$$

$$R: n_u(N-1) \times n,$$

$$R_u = \begin{bmatrix} -1 & 1 & 0 & & 0 & \ldots & 0 \\ 0 & -1 & 1 & & 0 & & 0 \\ & & & \ddots & & \vdots & \\ 0 & 0 & \ldots & -1 & 1 & & 0 \end{bmatrix},$$

$$R_u: (N-1) \times n$$

where
- n—number of decision variables (length of x)
- $n_u$—number of inputs (manipulated variables)
- N—number of control moves (blocks) per control input
- $n_z$—number of constrained outputs (controlled variables)
- R—delta constraints Further efficiency enhancements may be made to the various search method. For example, rotations may be used to simplify an active set (i.e., constraints) matrix A. Specifically, factorization may be used to rotate the active set matrix when a constraint is added or deleted from active set. The described stable implementation is based on a modified Cholesky factorization of the Hessian matrix G where U is an upper triangular matrix.

$$G = UU^T \tag{19}$$

Thus, the modified Cholesky factorization may be computed using a standard Cholesky factorization and a permutation matrix P as follows.

$$PGP^T = L_2 L_2^T \tag{20}$$

$$G = UU^T,$$

$$U = P^T L_2 P,$$

$$P = \begin{bmatrix} & & \iddots \\ 0 & 0 & 1 \\ 0 & 1 & 0 \\ 1 & 0 & 0 \end{bmatrix}$$

As described in equation (20) the Hessian matrix is first permuted. Then the standard Cholesky factorization is calculated. Finally, the triangular matrix is permuted to get matrix U. Accordingly the following factorization of the matrix $U^{-1}N^+$, where $T^+$ is an upper triangular matrix, may be used.

$$(M^+)^T U^{-1} N^+ = \begin{bmatrix} T^+ \\ 0 \end{bmatrix} \tag{21}$$

$$(M^+)^T M^+ = D^{-1}$$

$$D = \mathrm{diag}(d_1, d_2, \ldots d_n)$$

$$= \begin{bmatrix} D_1 & 0 \\ 0 & D_2 \end{bmatrix} \begin{matrix} \}q \\ \}n-q \end{matrix}$$

Furthermore, the $J^+$ matrix may be calculated by the following equation.

$$J^+ = U^{-T} M^+ \tag{22}$$

$$= [L^{-T} M_1^+ \quad L^{-T} M_2^+]$$

$$= \begin{bmatrix} \underbrace{J_1^+}_{q} & \underbrace{J_2^+}_{n-q} \end{bmatrix}$$

The described factorization has advantage of upper triangularity of matrix $U^{-1}$. Thus when $N^+$ is composed of an initial part of an identity matrix the factorization is readily available.

As described above, plane rotations may be performed when a constraint is added or removed from the active set. For example, constraint p may be removed from the active set because the corresponding dual variable $u_p$ is negative. Furthermore, the following matrix structure is assumed.

$$N^+ = [N_1 n_p N_2], \; N = [N_1 N_2], \tag{23}$$

Matrix $N^+$ may first be reordered so that normal $n_p$ is moved to the last column as follows.

$$N_r^+ = [N_1 N_2 n_p] \tag{24}$$

Thus, the triangularity of the matrix $T^+$ may be affected as follows.

$$(J^+) N_r^+ = \begin{bmatrix} T_H^+ \\ 0 \end{bmatrix} \begin{matrix} \}q \\ \}n-q \end{matrix} \tag{25}$$

$$= \begin{bmatrix} T_1 & S & t_{p1} \\ 0 & V & t_{p2} \\ 0 & 0 & 0 \end{bmatrix} \begin{matrix} \}p-1 \\ \}q-p+1 \\ \}n-q \end{matrix}$$

In order to restore its upper triangularity, a set of plane rotations Q may be applied to upper Hessenberg sub-matrix $[V \; t_{p2}]$ where $\gamma$ is scalar.

$$Q[V \quad t_{p2}] = \begin{bmatrix} T_2 & d_1 \\ 0 & \gamma \end{bmatrix}, \tag{26}$$

$$T_r^+ = \begin{bmatrix} I & 0 \\ 0 & Q \end{bmatrix} T_H^+$$

$$= \begin{bmatrix} T_1 & S & d_1 \\ 0 & T_2 & \\ 0 & 0 & \gamma \end{bmatrix}$$

$$= \begin{bmatrix} T & d_1 \\ 0 & \gamma \end{bmatrix},$$

-continued $$d = \begin{bmatrix} d_1 \\ \gamma \end{bmatrix}$$

To nullify elements under the main diagonal, the rotations may be applied to matrix rows in the following order: (1,2), (2,3), . . . (q-p, q-p+1). The same set of plane rotations Q may be applied to corresponding columns (p,p+1), . . . (q−1,q) of matrix $J^+$ as follows.

$$J^+ = \begin{bmatrix} \underline{J_1^+} & \underline{J_2^+} \\ q & n-q \end{bmatrix} \quad (27)$$

$$= \begin{bmatrix} \underline{J_{11}^+} & \underline{J_{12}^+} & \underline{J_2^+} \\ p & q-p & n-q \end{bmatrix}$$

$$J = \begin{bmatrix} \underline{J_{11}^+ \; J_{12}^+ Q^T} & \underline{J_2^+} \\ q & n-q \end{bmatrix}$$

$$= \begin{bmatrix} \underline{J_1} & \underline{J_2} \\ q-1 & n-q+1 \end{bmatrix}$$

On the other hand, constraints may be added to the active set when. For example, constraint $n_k$ may be added to active set as follows.

$$A_2 = AU\{k\},\ N_2 = [Nn_k],\ A^+ = A_2U\{p\},\ N^+ = [N_2 n_p] \quad (28)$$

To update the matrix $T_r^+$, the last column d is shifted to the right and a new column h is put in its place as follows.

$$N^+ = [N \; n_k \; n_p] \quad (29)$$

$$u_p = (1 - t)u_p$$

$$T_r^+ = [T_r^+(:, 1:q), h, d]$$

$$h = J^T n_k$$

$$= \begin{bmatrix} h_1 \\ h_2 \end{bmatrix} \begin{matrix} \}q \\ \}n-q \end{matrix},$$

$$d = \begin{bmatrix} d_1 \\ d_2 \end{bmatrix} \begin{matrix} \}q \\ \}n-q \end{matrix},$$

$$d_2 = [\underbrace{\gamma \; 0 \; \ldots \; 0}_{n-q}]^T$$

Similar to removing a constraint, for the new active set, a sequence of rotations Q may be applied to restore the triangularity. Based on the structure of the $T_r^+$, it may be sufficient to nullify all but the first element of the vector $h_2$. Specifically, the rotations to be applied in the planes (n−q, n−q−1), (n−q−1, n−q−2), . . . (2, 1) as follows.

$$h_2 \begin{bmatrix} x \\ x \\ x \\ x \end{bmatrix} \to \begin{bmatrix} x \\ x \\ y \\ 0 \end{bmatrix} \to \begin{bmatrix} x \\ z \\ 0 \\ 0 \end{bmatrix} \to \begin{bmatrix} \alpha \\ 0 \\ 0 \\ 0 \end{bmatrix} = \overline{h_2} \quad (30)$$

$$d_2 \begin{bmatrix} x \\ 0 \\ 0 \\ 0 \end{bmatrix} \to \begin{bmatrix} x \\ 0 \\ 0 \\ 0 \end{bmatrix} \to \begin{bmatrix} x \\ 0 \\ 0 \\ 0 \end{bmatrix} \to \begin{bmatrix} a \\ b \\ 0 \\ 0 \end{bmatrix} = \overline{d_2}$$

After these rotations are applied to $T_r^+$, the resulting triangular matrix is denoted as $T^+$. If fast rotations are applied then also corresponding diagonal elements of matrix D are updated. The same set of rotations may be applied to the columns of matrix $J^+$ as follows.

$$Qh_2 = \begin{bmatrix} \alpha \\ 0 \end{bmatrix} \} n - q = \overline{h_2}, \quad (31)$$

$$Qd_2 = \overline{d_2}$$

$$J = \begin{bmatrix} \underline{J_1^+} & \underline{J_2^+ Q^T} \\ q & n-q \end{bmatrix}$$

After the above operations, the number of active constraints and notation of matrices may be updated as follows.

$$q = q + 1, \quad (32)$$

$$J^+ = J = \begin{bmatrix} \underline{J_1^+} & \underline{J_2^+} \\ q & n-q \end{bmatrix},$$

In a dual active set solver method, when constraint $n^+$ is violated, the step direction may be calculated as follows.

$$J^T n^+ = \begin{bmatrix} J_1^T \\ J_2^T \end{bmatrix} n^+ = \begin{bmatrix} d_1 \\ d_2 \end{bmatrix} = d \quad (33)$$

$$z = Hn^+ = J_2 D_2 d_2$$

$$r = -T^{-1} d_1$$

As used herein the primal space is represented by z and the dual space is represented by r. And, when the constraint $n^+$ is selected to be deleted from the active set, step direction may be calculated as follows.

$$z = -Hn^+ = -J_2 D_2 d_2$$

$$r = T^{-1} d_1 \quad (34)$$

As described in the Detailed Description section, the dual active set solver 122 and the primal active set solver 124 search methods may be implemented through various implementations. More specifically, each implementation of the solver methods (i.e., 122 and 124) may be based on a method of matrix factorization. For example, the techniques described herein may be based on the Goldfarb method of matrix factorization. Alternatively, other implementations of the search methods may be used; however, to improve the transition between the dual active set solver 122 and the primal active set solver 124, it may be beneficial to utilize implementations that are based on the same matrix factorization method. Thus, the matrix factorization function may be shared by the solver methods (i.e., 122 and 124) and the transition may be seamless. Other matrix factorization pairings that facilitate these benefits are as follows:

Dual: Goldfarb and Idnani method, Primal: Goldfarb method;

Dual: QPSchur method, Primal: Schur complement method;

Dual: Gram-Schmidt range-space method, Primal: Gram-Schmidt range-space method; or Dual: Null-space method, Primal: Null-space method.

Finally, as described above in the Detailed Description Section, various embodiments of the projection operation 136 may be used. For example, when constraints are simple, sparse or well-structured the projection operation 136 may be efficiently calculated. In particular, the projection operation (PROJ) 136 described below may be used on the following simple constraints.

$i=0 \ldots n_c-1$:

$u_{min}(n) \leq u_n(t+i) \leq u_{max}(n)$ —simple bounds $\Delta u_{min}(n) \leq \Delta u_n(t+i) \leq \Delta u_{max}(n)$ —rate of change constraints (35)

Hard constraints may be imposed by clipping as follows.

$$C_{abs}(u_n(t+i)) = \begin{cases} u_{min}(n) & \text{if } u_n(t+i) < u_{min}(n) \\ u_{max}(n) & \text{if } u_{max}(n) < u_n(t+i) \\ u_n(t+i) & \text{otherwise} \end{cases} \quad (36)$$

Similarly, rate of change (ROC) constraints may be imposed by clipping as follows $$C_{roc}(u_n(t+i)) = \begin{cases} u_n(t) + \Delta u_{min}(n) & \text{if } u_n(t+i) - u_n(t) < \Delta u_{min}(n) \\ u_n(t) + \Delta u_{max}(n) & \text{if } u_n(t+i) - u_n(t) > \Delta u_{max}(n) \\ u_n(t+i) & \text{otherwise} \end{cases} \quad (37)$$

Thus, the projection operation 136 may be defined as follows.

$\text{PROJ}(u_n) = C_{roc}(C_{abs}(u_n))$ (38)

Once a feasible point is obtained, the corresponding initial active set may be calculated. Furthermore, to exploit the final matrix factorizations of infeasible search 86, the initial active set of the feasible solver 88 may be equal to the final active set of infeasible search 86. After the projection operation 136, some of the constraints may no longer be active and vice versa. If a constraint is no longer active, then it may be designated as artificial. During the course of the run of the optimization calculation, artificial active constraints may be deleted preferentially. If a constraint becomes active after the projection operation, it is not added to the initial active set of the feasible solver 88, but may be added during the execution of the feasible solver 88.

Generally, the above techniques enable deterministic optimization control to be used with plants/process 12 with fast dynamics. More specifically, the OBC 22 is configured to advantageous utilize the characteristics of feasible and infeasible search methods to provide a feasible control trajectory during each control time, which in some embodiments includes using the infeasible search method and the feasible search method sequentially. In other words, the control time may be divided between the two search methods.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A control method, comprising:
determining, using a control system, a state of an industrial automation plant based at least in part on output variables of the industrial automation plant measured by one or more sensors communicatively coupled to the control system;
performing, using the control system, an infeasible search starting at a first point outside a feasible region during a first portion of a predetermined sample period based at least in part on the state of the industrial automation plant to determine a first control trajectory of a plurality of input variables used to control operation of the industrial automation plant;
performing, using the control system, a feasible search starting at a second point inside the feasible region during a second portion of the predetermined sample period based at least in part on the state of the industrial automation plant to determine a second control trajectory of the input variables when the first control trajectory is not feasible;
controlling operation of the industrial automation plant based on the first control trajectory when the first control trajectory is feasible by determining a first control action based at least in part on the first control trajectory and instructing an actuator in the industrial automation plant to perform the first control action; and
controlling, using the control system, operation of the industrial automation plant based on the second control trajectory when the first control trajectory is not feasible by determining a second control action based at least in part on the second control trajectory and instructing the actuator in the industrial automation plant to perform the second control action.

2. The control method of claim 1, wherein:
performing the infeasible search comprises solving a constrained quadratic programming problem of an optimization-based control algorithm; and
performing the feasible search comprises solving the constrained quadratic programming problem.

3. The control method of claim 2, wherein:
performing the infeasible search comprises executing a dual active set solver algorithm to solve the constrained quadratic programming problem; and
performing the feasible search comprises executing a primal active set solver algorithm to solve the constrained quadratic programming problem.

4. The control method of claim 1, comprising determining, using the control system, whether the first control trajectory is feasible based at least in part on constraints on operation of the industrial automation plant.

5. The control method of claim 1, wherein the feasible region comprises points that meet each constraint on operation of the industrial automation plant.

6. The control method of claim 1, wherein:
the first point violates one or more constraints on operation of the industrial automation plant; and
the second point meets each of the one or more constraints on operation of the industrial automation plant.

7. The control method of claim 1, comprising determining the second point based at least in part on the first control trajectory when the first control trajectory is not feasible.

8. The control method of claim 1, comprising, when the first control trajectory is not feasible:
determining, using the control system, a first stabilizing control trajectory by projecting the first control trajectory into the feasible region, wherein the first stabilizing control trajectory comprises a point in the feasible region closest to the firsts control trajectory;
determining, using the control system, a second stabilizing control trajectory by shifting and padding a third control trajectory determined in a previous sample period;

determining, using the control system, a first cost associated with the first stabilizing control trajectory and a second cost associated with the second stabilizing control trajectory based at least in part on an objective function;

selecting, using the control system, the first stabilizing control trajectory as the second point when the first cost is lower than the second cost; and selecting, using the control system, the second stabilizing control trajectory as the second point when the second cost is lower than the first cost.

9. The control method of claim 1, comprising cyclically repeating the control method during real-time control of the plant.

10. An industrial automation system, comprising:
one or more sensors that are configured to, in operation, measure output variables of the industrial automation system; and
a control system communicatively coupled to the one or more sensors, wherein the control system comprises memory circuitry configured to store executable code and processing circuitry configured to execute the executable code to:
determine state of the industrial automation system based at least in part on the output variables of the industrial automation system measured by the one or more sensors;
perform an infeasible search initiated from a first point outside a feasible region during a first portion of a predetermined sample period based at least in part on the state of the industrial automation system to determine a first control trajectory of a plurality of input variables used to control operation of the industrial automation system;
perform a feasible search initiated from a second point inside the feasible region based at least in part on the state of the industrial automation system during a second portion of the sample period to determine a second control trajectory when the first control trajectory is not feasible;
control operation of the industrial automation system based on the first control trajectory when the first control trajectory is feasible by determining a first control action based at least in part on the first control trajectory and instructing an actuator in the industrial automation system to perform the first control action; and
control operation of the industrial automation system based on the second control trajectory when the first control trajectory is not feasible by determining a second control action based at least in part on the second control trajectory and instructing the actuator in the industrial automation system to perform the second control action.

11. The industrial automation system of claim 10, wherein the processing circuitry comprises a multi-core processor, wherein:
a first core of the multi-core processor is configured to be dedicated to performing the infeasible search, the feasible search, or both; and
a second core of the multi-core processor is configured to control operation of the industrial automation system.

12. The industrial automation system of claim 10, wherein the processing circuitry comprises a multi-core processor, wherein:
a first core of the multi-core processor is configured to be dedicated to performing the infeasible search; and
a second core is configured to be dedicated to performing the feasible search.

13. The industrial automation system of claim 10, wherein the processing circuitry is configured to, when the first control trajectory is not feasible:
determine a first stabilizing control trajectory by projecting the first control trajectory into the feasible region;
determine a second stabilizing control trajectory by shifting and padding a third control trajectory determined in a previous sample period; and
determine a first cost associated with the first stabilizing control trajectory and a second cost associated with the second stabilizing control trajectory based at least in part on an objective function, wherein the second point comprises the first stabilizing control trajectory when the first cost is lower than the second cost and the second stabilizing control trajectory when the second cost is lower than the first cost.

14. The industrial automation system of claim 10, wherein the processing circuitry is configured to determine that the first control trajectory is feasible when each control action of the first control trajectory meets constraints on operation of the industrial automation system.

15. The industrial automation system of claim 10, wherein the feasible region comprises each control trajectory that satisfies constraints on operation of the industrial automation system.

16. The industrial automation system of claim 10, wherein the processing circuitry is configured to determine the second point based at least in part on the first control trajectory when the first control trajectory is not feasible.

17. A, tangible, non-transitory, machine-readable medium that stores instructions executable by processing circuitry of a control system, wherein the instructions comprise instructions to:
determine, using the processing circuitry, state of an industrial automation process based at least in part on output variables of the industrial automation process measured by one or more sensors communicatively coupled to the processing circuitry;
perform, using the processing circuitry, an infeasible search during a first portion of a predetermined sample period by initiating the infeasible search from a first point in an infeasible region based at least in part on the state of the industrial automation process to determine a first control trajectory of a plurality of input variables used to control operation of the industrial automation process;
perform, using the processing circuitry, a feasible search during a second portion of the predetermined sample period by initiating the feasible search from a second point in a feasible region based at least in part on the state of the industrial automation process to determine a second control trajectory of the input variables when the first control trajectory is not feasible;
control, using the processing circuitry, operation of the industrial automation process based on the first control trajectory when the first control trajectory is feasible by determining a first control action based at least in part on the first control trajectory and instructing an actuator in the industrial automation process to perform the first control action; and
control, using the processing circuitry, operation of the industrial automation process based on the second control trajectory when the first control trajectory is not feasible by determining a second control action based at least in part on the second control trajectory and instructing the actuator in the industrial automation process to perform the second control action.

18. The tangible, non-transitory, machine-readable medium of claim 17, comprising instructions to, when the first control trajectory is not feasible:
   determine, using the processing circuitry, a first stabilizing control trajectory by projecting the first control trajectory from the infeasible region to the feasible region;
   determine, using the processing circuitry, a second stabilizing control trajectory by shifting and padding a third control trajectory determined in a previous sample period;
   determine, using the processing circuitry, a first cost associated with the first stabilizing control trajectory and a second cost associated with the second stabilizing control trajectory based at least in part on an objective function;
   select, using the processing circuitry, the first stabilizing control trajectory as the second point when the first cost is lower than the second cost; and
   select, using the processing circuitry, the second stabilizing control trajectory as the second point when the second cost is lower than the first cost.

19. The tangible, non-transitory, machine-readable medium of claim 17, wherein:
   the infeasible region comprises a first plurality of points that each violates one or more constraints on operation of the industrial automation process, wherein the first plurality of points comprises the first point; and
   the feasible region comprises a second plurality of points that each satisfies each of the one or more constraints on operation of the industrial automation process, wherein the second plurality of points comprises the second point.

20. The tangible, non-transitory, machine-readable medium of claim 17, comprising instructions to determine whether the first control trajectory is feasible by determining whether each control action of the first control trajectory meets constraints on operation of the industrial automation process.

* * * * *